Feb. 21, 1933.    J. H. BAIR    1,898,162
GRADOMETER
Filed Jan. 7, 1928
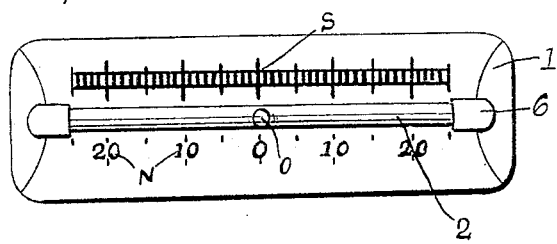
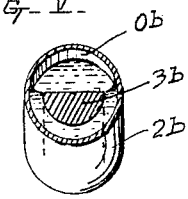
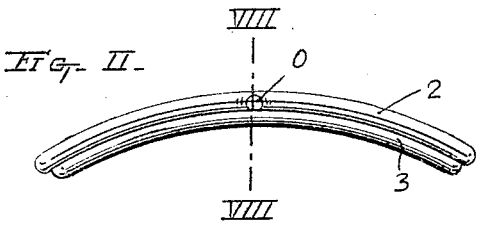
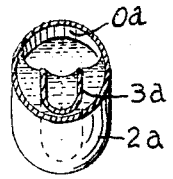
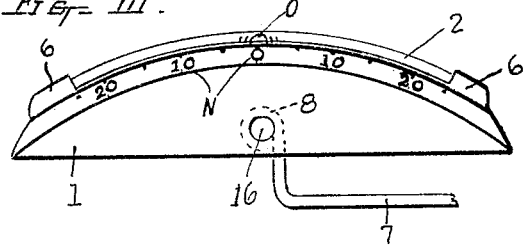
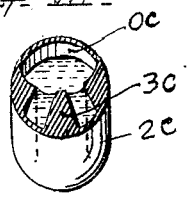
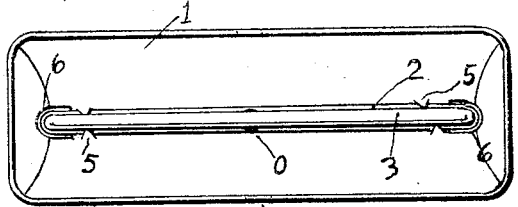
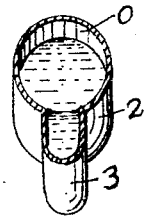
INVENTOR
Joseph H. Bair Patented Feb. 21, 1933

1,898,162

UNITED STATES PATENT OFFICE

JOSEPH H. BAIR, OF CAMP HILL, PENNSYLVANIA

GRADOMETER

Application filed January 7, 1928. Serial No. 245,213.

My invention relates to gradometers and performance meters of the class comprising a curved, glass spirit-level carrying fluid and a bubble therein and a scale therewith, and which is adapted to be installed in a motor vehicle to register the grade traversed by it, and to denote by the advancement and retraction of the bubble, due to the acceleration and retardation of the speed of the vehicle, its performing capacity. This capacity is always directly expressed in terms of the hill climbing capacity of the motor or in terms of down hill holding capacity of the brakes. The invention is also applicable to aeroplanes to measure their longitudinal and transverse inclinations in flight and to indicate of their efficiency by means of their accelerating ability.

The primary object of the invention is to provide a gradometer that is simple and practical, accurate and reliable, inexpensive and self-contained and at the same time is ornate.

Another object is to provide, at the same time and with the same device, means for measuring the acceleration and retardation capacity of the motor-vehicle in which it is installed and by means of which the over-all efficiency of said vehicle can be ascertained. A form upon which the results of these empirical tests on the vehicle, when in prime condition, can be tabulated and retained in an accessible position for comparison with subsequent tests to ascertain how near to, or how far from, the norm each test comes.

This device is so constructed as to obviate the common difficulties of bubble adaptation, under varying conditions, to the requirements of gravity and to provide the same facility for the bubble excursions, due to acceleration and retardation of the vehicle in which it is installed, so as to be the means by which its power and resistance factors can be measured.

If it were possible to have a very small glass-tube, say about one sixteenth of an inch bore as compared with the standard size of about three eighth of an inch, and if it were possible to maintain the meniscus, or fluid connection, under the bubble in that small tube then the bubble would be free to move from end to end in the tube, as it were variously tilted, to meet the requirements of gravity. This is precisely what is accomplished in my invention. And to achieve it, a second principle-capillarity is taken advantage of. The container is so constructed that it has a main, longitudinal canal, in cross-sectional size, beyond the range of capillarity of the fluid it contains, and one or more accessory canals, co-operating with it, each within the range of capillarity. Fluid will not drain out between surfaces, by gravity, that are within the bounds of capillarity, and therefore no matter how large the bubble may be in the main canal, the fluid connections under it in the accessory canal is always the same. The travel of the bubble is not impeded, or blocked, by its size, and the object is ideally accomplished.

Capillarity for different fluids and for different containers is vastly different. The size of the capillary canal and its material, and even the fluid, are by no means the only factors. Temperature is one of the main factors that concerns this invention. The most practical size for the main canal is about one sixteenth of an inch in diameter. This is under all conditions above the capillary range of any suitable fluid, which may be alcohol, carbon tetrachloride or benzine. It is best to keep the tube in size as near just above the capillary limit as possible for then the fluid contained in the spirit level will be the minimum and the bubble will be least affected in size due to cold and heat. The width of the accessory canal, to maintain the capillary attraction, and to prevent the bubble from dipping down between its walls as it enlarges is about one thirty second of an inch. Its depth depends on the specific gravity of the fluid used. On its depth depends the extent of the bubble's excursion for any given power impulse. It is desirable to make the depth such that the bubble moves to the point on the scale of percent grade, of the gradometer, upon full acceleration to represent the hill-climbing capacity of the motor vehicle in which it is installed. This depth for alcohol is approximately one eighth of an inch; for carbon tetrachloride it is less.

When a depth of the accessory canal is found that allows the bubble to advance to the proper point upon acceleration, upon retardation by brakes it will also retract to the point on the scale to indicate restraining power.

In this construction the amount of fluid, in the entire tube, at a mean temperature, is about forty times the volume of the bubble, instead of three hundred times its size in the standard type. In the warmest weather the bubble is still large enough to be favorably visible, while in the coldest, cold weather it is still a fairly small globule not over three times the volume of that in the warmest weather. At a mean temperature, when motoring is most general the bubble is at the most favorable size. At no time, whether in the hottest or coldest weather, can the bubble partake of, and react to, the jolts which produce the distracting tremors in the normal spirit-level and which render the pendulum useless for the purpose in a moving vehicle. The globule responds only to the demands of gravity, acceleration and retardation.

It is essential that the fluid in the tube be non-freezable, and that its expansion and contraction to heat and cold be the minimum. Of the fluids tested for the purpose it is found that carbon tetrachloride is the most suitable because its specific gravity is several times that of alcohol, or of petrol. Its freezing point is much lower as also is its freezing contraction. Its viscosity is also less. It takes a certain, pale stain which gives the bubble, by contrast a mellow, mercury-like sheen which renders it very much more visible, especially in the twilight when readings are normally difficult.

When the excursion of the bubble, in the gradometer attached to a motor vehicle, is the measuring means for the power or the resistance applied to the vehicle to produce acceleration or retardation, thereof, its inevitable change of size due to varying temperatures must not be a varying factor in its amount of excursion for a given acceleration or retardation of the vehicle. In the common, spirit-level, and in the commercial gradometer where the common, curved spirit-level is adopted, the lower the temperature the larger the bubble, and inversely, the smaller the meniscus, or fluid connection under the bubble and by means of which the fluid is transferred from one end of the bubble to the other when it makes a change of position. The speed and distance of the bubble excursion, due to a certain amount of acceleration, is related to the size of fluid connection under the bubble. But in this invention, no matter what the size of the bubble, the fluid connection under it is always the same and the amount and facility of its excursion, for a given power or resistance application, to the speed of the vehicle in which it is installed, is always the same. Connected with a scale it is a most accurate and convenient means of measuring power and resistance.

Referring now to the drawing:

Figure I is a plan view of the gradometer.

Figure II is an elevational view of the preferred form of the spirit-level to be used in the gradometer.

Figure III is a side elevation of the case with the glass spirit-level installed.

Figure IV is a bottom view of what is shown in plan in Figure I and in elevation in Figure III.

Figures V, VI, VII and VIII show enlarged, cross-sectional views (the sections being through the bubble VIII—VIII of Figure II) of various modifications of the preferred type (Figure VIII) that all fulfill the requirement of always maintaining the fluid connection under the bubble, no matter what its size, by means of capillarity.

1 is the formed-up case which carries the scale S and the percent, grade numbers N and which houses the curved, glass spirit level 2 to which it conforms and half embeds in a trough which terminates in hasps 6 to retain the half embedded tube in position. The scale and numbers on the case parallel the tube. The case is so curved and has such a velvety, non-glare texture, and the top is so flared that no matter where the source of light is or from what position the scale is read there is no obscurity or high light to render difficult the reading of the instrument. The trough in the botom of the case is bottomless which permits the glass to be pushed up from below into position against the hasps and to be retained there by ears 5 adapted to be bent over for the purpose. The bottomless trough also permits the light to seep in from below through the glass bearing, the pale-tinted liquid giving it a glow, which by color contrast it imparts to the bubble, which otherwise, and normally, would have an evanescent haziness, substance and legibility and a mellow sheen and which makes it resemble a highly lighted globule of mercury.

The curved glass-tube, embodying the spirit-level 2, carries a trough 3, integral with it, which conforms to its curvature and communicates, throughout, with its main canal. In the forms of levels 2 and 2c, the accessory channels 3 and 3c are attained by casting them integrally with the tubes while in tubes 2a and 2b they are accomplished by inserting a trough 3a and a half-round 3b each of which conforms to the tube's curvature and is sealed into position with the tube at its ends. All the bubbles, O, Oa, Ob and Oc, differ in cross-sectional shape because of different inserts or of the modification of the tubes carrying them. It is obvious that the structure of these tubes, or their inserts, may be modified in an indefinite number of ways and yet fulfill the essential requirements of the invention. These requirements are that the structure of the tube to be filled with liquid and a bubble, and constituting the spirit level, embraces a main channel that is beyond the range of its capillary-attraction for that fluid, and an accessory one (or ones), conforming to it and communicating, throughout, with it, but which is (or are) within its capillary-attraction range for the fluid, and which co-operate with said main channel in maintaining a fluid connection under the bubble therein, no matter what its variation in size may be.

The means of attaching my invention to a motor vehicle, is a bracket, or stud, 7, illustrated in Fig. III. The fixture is screwed, or clamped at a convenient place so that its pivoting eyelet 8, spanning the distance between the side-walls of case 1 and lining up with the holes 16, are engaged by a bolt by which they can be tightened rigidly to maintain the bubble O always at the zero point of the scale S when the vehicle stands on the level.

Having now described my invention, and disclosed it in terms of the principles embodying it, I claim:

1. In a gradometer a tube containing fluid to form a bubble said tube comprising a main channel in size beyond the virtual range of its capillarity for said fluid and an accessory canal; said channel and canal being substantially parallel and in open free communication substantially throughout their effective course.

2. In a gradometer comprising a spirit level, a scale and means for installing it in a motor vehicle the combination of a tube containing fluid to form a bubble; said tube comprising a main channel in size beyond the virtual range of its capillarity for said fluid and an accessory canal within the virtual range of that capillarity and communicating and cooperating with the main channel in such a way that said bubble always advances or retracts to the same degree to any given increment of power or resistance asserted on said vehicle and indicates on the scale substantially as described.

3. In a gradometer comprising a spirit level the combination of a tube and a narrow channel substantially parallel therewith and in open free communication with each other substantially throughout their effective course, substantially as described.

JOSEPH H. BAIR.